(12) United States Patent
Rangan et al.

(10) Patent No.: US 8,750,091 B2
(45) Date of Patent: Jun. 10, 2014

(54) APPARATUS AND METHODS FOR UPDATE OF SYMBOL INFORMATION

(75) Inventors: Sundeep Rangan, Jersey City, NJ (US); Atul Maharshi, Jersey City, NJ (US); Frank Lane, Asbury, NJ (US); Ozge Koymen, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 12/408,790

(22) Filed: Mar. 23, 2009

(65) Prior Publication Data

US 2009/0245093 A1 Oct. 1, 2009

Related U.S. Application Data

(60) Provisional application No. 61/041,242, filed on Mar. 31, 2008.

(51) Int. Cl.
*H04J 11/00* (2006.01)
*H04L 27/26* (2006.01)

(52) U.S. Cl.
CPC ................................. *H04L 27/2663* (2013.01)
USPC ........................................................ 370/210

(58) Field of Classification Search
CPC ................................................. H04L 27/2663
USPC ......................................... 370/280, 281, 210
See application file for complete search history.

(56) References Cited

U.S. PATENT DOCUMENTS

| | | | | |
|---|---|---|---|---|
| 6,633,619 B1 * | 10/2003 | Waller et al. | .................. | 375/354 |
| 6,731,624 B1 * | 5/2004 | Maekawa et al. | ............. | 370/350 |
| 6,836,518 B1 * | 12/2004 | Sano et al. | ..................... | 375/343 |
| 6,904,550 B2 * | 6/2005 | Sibecas et al. | ................ | 714/714 |
| 6,987,754 B2 * | 1/2006 | Shahar et al. | .................. | 370/349 |
| 7,177,376 B2 * | 2/2007 | Atungsiri et al. | ............. | 375/343 |
| 7,227,909 B2 * | 6/2007 | Schell | ............................ | 375/297 |
| 7,415,595 B2 * | 8/2008 | Tell et al. | ......................... | 712/32 |
| 7,542,516 B2 * | 6/2009 | Pirooz et al. | ................... | 375/260 |
| 7,620,370 B2 * | 11/2009 | Barak et al. | ................ | 455/67.13 |

(Continued)

FOREIGN PATENT DOCUMENTS

| | | |
|---|---|---|
| EP | 1770937 A2 | 4/2007 |
| JP | 2005318246 A | 11/2005 |

OTHER PUBLICATIONS

International Search Report & Written Opinion—PCT/US2009/038468, International Search Authority—European Patent Office—Jul. 3, 2009.
Taiwan Search Report—TW098110189—TIPO—Oct. 17, 2012.

*Primary Examiner* — Ricky Ngo
*Assistant Examiner* — Ben H Liu
(74) *Attorney, Agent, or Firm* — Stanton Braden (57) ABSTRACT

Apparatus and methods for updating symbol information in a communication device with hardware such as a microcontroller are disclosed. The disclosed apparatus and methods employ waiting for the beginning of a symbol in a sample stream at a predetermined time. One or more programmed instructions are read at the beginning of the symbol, and then symbol information is updated based on the one or more programmable instructions and setting a time for a beginning of a next symbol. The programmed instructions consist of instruction code words that are executed by a dedicated microcontroller or similar hardware, which affords flexibility for updating symbol information, particularly for multimode communication devices operable across multiple communication technologies.

10 Claims, 10 Drawing Sheets

(56) References Cited

U.S. PATENT DOCUMENTS

| | | | |
|---|---|---|---|
| 7,693,237 B2 * | 4/2010 | Mehrnia et al. | 375/316 |
| 7,764,595 B2 * | 7/2010 | Treigherman | 370/208 |
| 2005/0265488 A1 * | 12/2005 | Jung | 375/340 |
| 2006/0215779 A1 * | 9/2006 | Shiina | 375/260 |
| 2007/0070934 A1 * | 3/2007 | van Rooyen | 370/328 |
| 2007/0071036 A1 * | 3/2007 | Okunev et al. | 370/503 |
| 2008/0192845 A1 * | 8/2008 | Aizawa et al. | 375/260 |
| 2009/0003471 A1 * | 1/2009 | Bick et al. | 375/260 |
| 2010/0183104 A1 * | 7/2010 | Alexander et al. | 375/346 |

* cited by examiner

| Line | Operation | Parameter Type | Value | Branch dst | Description |
|---|---|---|---|---|---|
| | 4 bits | 4 bits | 16 bits | 8 bits | |
| 0 | SET | N_FFT | 1024 | X | Set parameters |
| 1 | SET | N_CP | 128 | X | |
| 2 | SET | N_WIN | 32 | X | |
| 3 | SET | N_GUARD | 0 | X | |
| 4 | SET | ACTIVE | 1 | X | |
| 5 | WAIT | SYM_CNT | 8 | X | Wait for frame boundary |
| 6 | SET | SYM_CNT | 0 | X | Reset symbol counter |
| 7 | INCR | FRAME_CNT | 1 | X | Increment frame counter |
| 8 | BNEQ | FRAME_CNT | 26 | 5 | Check for SF boundary |
| 9 | SET | FRAME_CNT | 0 | X | Reset frame counter |
| 10 | INCR | SUPER_CNT | 1 | X | Increment SF counter |
| 11 | BNEQ | NULL_PARAM | X | 5 | Unconditional branch |

Fig. 11

APPARATUS AND METHODS FOR UPDATE OF SYMBOL INFORMATION

CLAIM OF PRIORITY UNDER 35 U.S.C. §119

The present Application for Patent claims priority to Provisional Application No. 61/041,242 entitled "MICROCONTROLLER-BASED OFDM COUNT SEQUENCER" filed Mar. 31, 2008, and assigned to the assignee hereof and hereby expressly incorporated by reference herein.

BACKGROUND

1. Field

The present disclosure relates generally to apparatus and methods for updating symbol information in a communication device, and more specifically to using programmable microcode instructions executable by a microcontroller to update symbol information at each symbol including symbol parameters and symbol counts.

2. Background

In recent years, a number of OFDM standards have been proposed for 4G cellular wireless. It is desirable to have a single device act as a common, or "universal", front-end processor for all such systems. One of the challenges in making such a universal processor is that different wireless standards use different OFDM symbol parameters and different symbol and frame numbering. For example, one OFDM system may employ 8 symbols per frame, while another OFDM system might employ 14 symbols per frame. Also, even systems employing the same standard may be configured in different ways depending on various particular deployment parameters such as bandwidth, cyclic prefix length and Time Division Duplexing (TDD).

The most straightforward method for supporting several standards is to have separate hardware logic for each possible system. However, using dedicated logic for each system configuration leads to unnecessary duplication of hardware, and is not flexible to support new systems and configurations. Another method is to represent the different standards by some set of key OFDM parameters such as FFT length, cyclic prefix length, and framing parameters. The parameters could then be made configurable, generally through registers set by a programmable device such as a DSP.

Unfortunately, symbol and frame numbering across different systems is typically highly irregular and not easily described by a small number of parameters. Also, in some systems like LTE, system parameters such as CP length change on particular symbols, and a number of parameter registers would be needed to describe the timing of those changes. Accordingly, it would be desirable to support several standards in a multimode communication device, such as an OFDM communication device, without the need for separate hardware logic for each standard supported, while also allowing sufficient configurability to support many different systems and a larger number of attendant parameters.

SUMMARY

According to an aspect, a method for updating symbol parameters in a communication device is disclosed. The method include waiting for the beginning of a symbol in a sample stream at a predetermined time, and reading one or more programmed instructions at the beginning of the symbol. The method further includes updating symbol information based on the one or more programmable instructions and setting a time for a beginning of a next symbol.

According to another aspect, an apparatus for updating symbol information in a communication device is disclosed. The apparatus includes a count sequencer module configured to wait for the beginning of a symbol in a sample stream at a predetermined time, and read one or more programmed instructions at the beginning of the symbol from an instruction memory. The count sequencer module is further configured to update symbol information based on the one or more programmable instructions and set a time for a beginning of a next symbol.

In yet another aspect, an apparatus for updating symbol information in a communication device is disclosed. The apparatus includes means for waiting for the beginning of a symbol in a sample stream at a predetermined time, and means for reading one or more programmed instructions at the beginning of the symbol. The apparatus also includes means for updating symbol information based on the one or more programmable instructions and setting a time for a beginning of a next symbol.

According to one more aspect, a computer program product comprising a computer-readable medium is disclosed. The computer-readable medium includes code for causing a computer to wait for the beginning of a symbol in a sample stream at a predetermined time, as well as code for causing a computer to read one or more programmed instructions at the beginning of the symbol. The medium also includes code for causing a computer to update symbol information based on the one or more programmable instructions and to set a time for a beginning of a next symbol.

BRIEF DESCRIPTION OF THE DRAWINGS

It is noted that like numerals refer to like parts throughout the several views of the drawings.

DETAILED DESCRIPTION

The proposed methods and apparatus use a general microcontroller, as an example, or some equivalent device for setting the OFDM symbol parameters and keeping track of symbol and frame numbering in a communication device.

Specifically, the OFDM parameters for the current symbol, along with its symbol and frame counters are stored in a set of registers, as an example. Instructions to set the parameters and counters are stored as microcode in some programmable memory. On each new symbol, a hardware microcontroller reads and processes one or more microcode instructions that can change the value of the symbol parameters or counters, potentially conditional on the symbol number. Some microcode instructions may also be reserved for controlling which is the next instruction to read. With a small number of instructions and simple hardware, the microcontroller-based control provides a highly flexible method for describing the symbol and frame numbering that can be used in a multimode device for accommodating a large number of OFDM systems including Long Term Evolution (LTE), WiMax, and Ultra Mobile Broadband (UMB), as well as TDD and Frequency Division Duplexing (FDD) configurations of those systems.

The word "exemplary" is used herein to mean "serving as an example, instance, or illustration." Any embodiment described herein as "exemplary" is not necessarily to be construed as preferred or advantageous over other embodiments.

Figure 1:
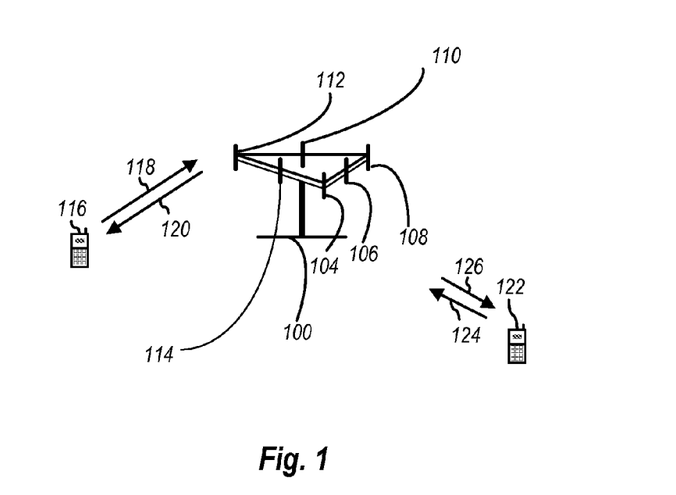
FIG. 1 illustrates a multiple access wireless communication system in which the presently disclosed apparatus and methods may be employed.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 122. In addition, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology. Additionally, the system in FIG. 1 may be a MIMO system employing multiple (NT) transmit antennas and multiple (NR) receive antennas for data transmission. A MIMO channel formed by the NT transmit and NR receive antennas may be decomposed into NS independent channels, which are also referred to as spatial channels. Each of the NS independent channels corresponds to a dimension. The MIMO system can provide improved performance (e.g., higher throughput and/or greater reliability) if the additional dimensionalities created by the multiple transmit and receive antennas are utilized.

Figure 2:
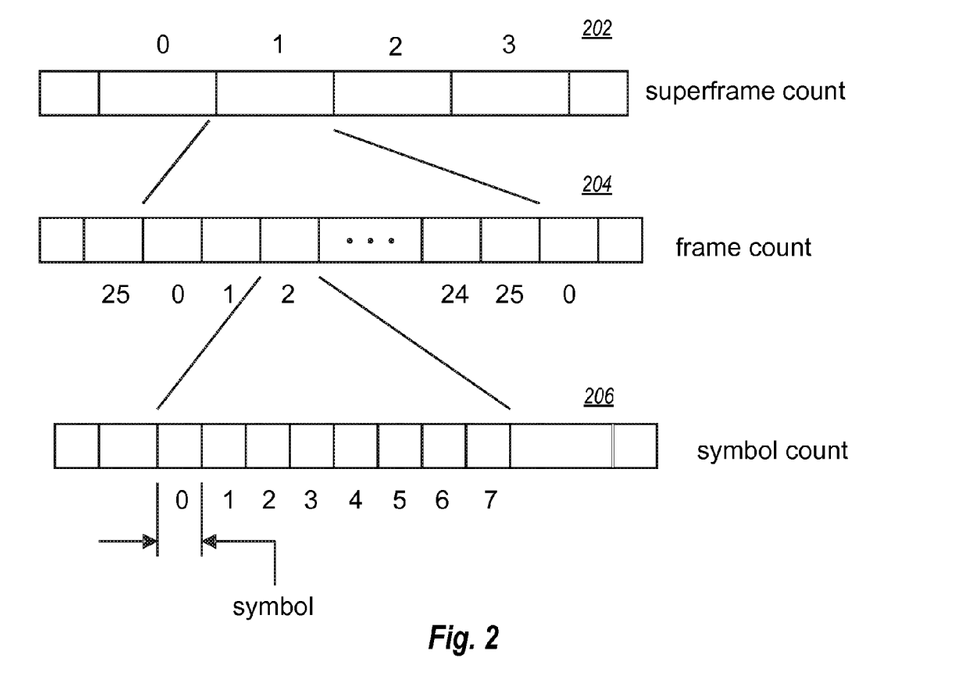
FIG. 2 is an example of symbol counting in a hierarchical counting structure for an OFDM system.
Figure 3:
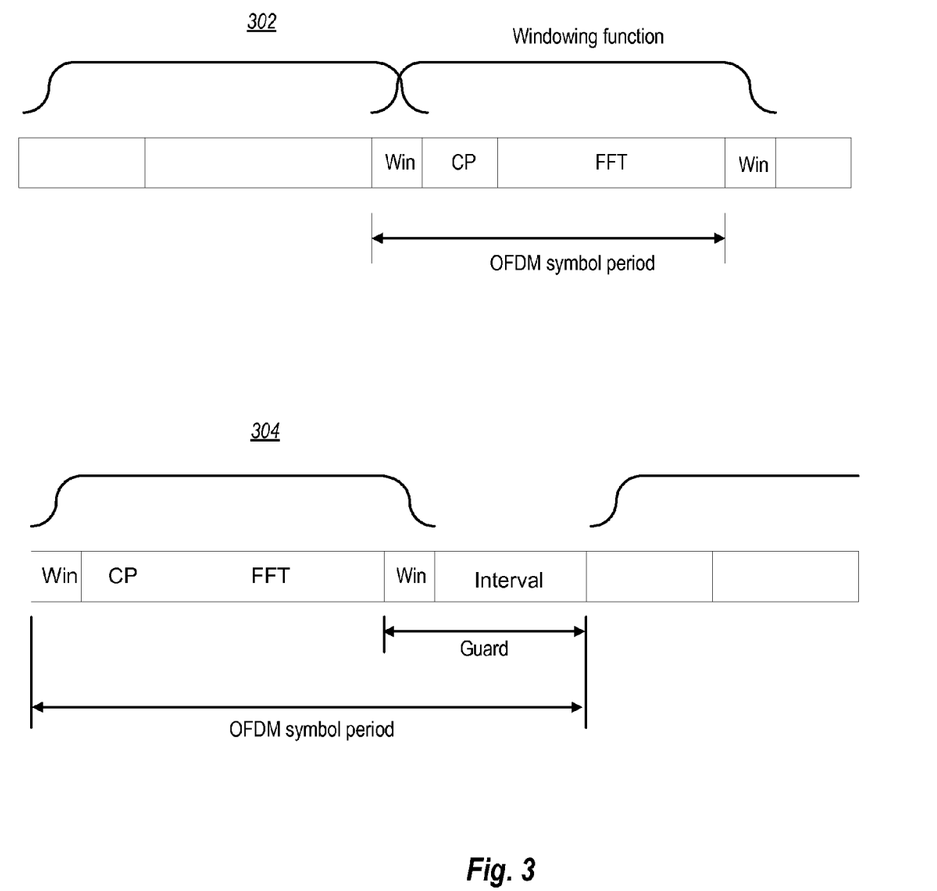
FIG. 3 is an illustration of two examples of different symbol constructions that may be used in an OFDM communication system.

FIG. 2 illustrates an example of how symbols are counted in a hierarchical counting structure for an OFDM system, such as in UMB, LTE, or WiMax OFDM systems. The highest level 202 is the superframe count, where each superframe consists of a particular number of frames. As illustrated in the example of FIG. 3, a superframe 1 may contain 26 frames (shown numbered from 0 to 25) illustrated in the next hierarchical level 204, which is a frame count. In turn, each frame may contain a particular number of symbols. FIG. 3 illustrates an exemplary symbol count of 8 symbols in a frame, as shown by symbol count level 206 expanding a frame of level 204. Each symbol has a particular duration. For example, in some UMB systems, the symbol duration is approximately 0.91 msec in length. It is noted that the example of FIG. 3 is typical for UMB systems having a regular pattern. One skilled in the art will appreciate that other hierarchical counting schemes are contemplated by the present application, such as LTE or WiMax, which may have regular or irregular pattern. Furthermore, it is noted that symbol construction, and thus symbol parameters, may change from symbol to symbol, such as in systems having TDD guard times, or variable symbol times, such as LTE.

FIG. 3 illustrates two examples of different symbol constructions that may be used in an OFDM communication system. A first example 302 illustrates a regular OFDM symbol having parameters such as a window (Win), a cyclic prefix (CP), and the fast Fourier Transform (FFT) tones or data transmitted in the frame. In another example 304, the OFDM frame may include an additional guard period interval parameter between symbols that is useful for TDD switching, as an example. It is noted also that across different OFDM systems, or even within a same OFDM system, the symbol parameters such as the CP, FFT and guard interval times may be different from symbol to symbol.

Figure 4:
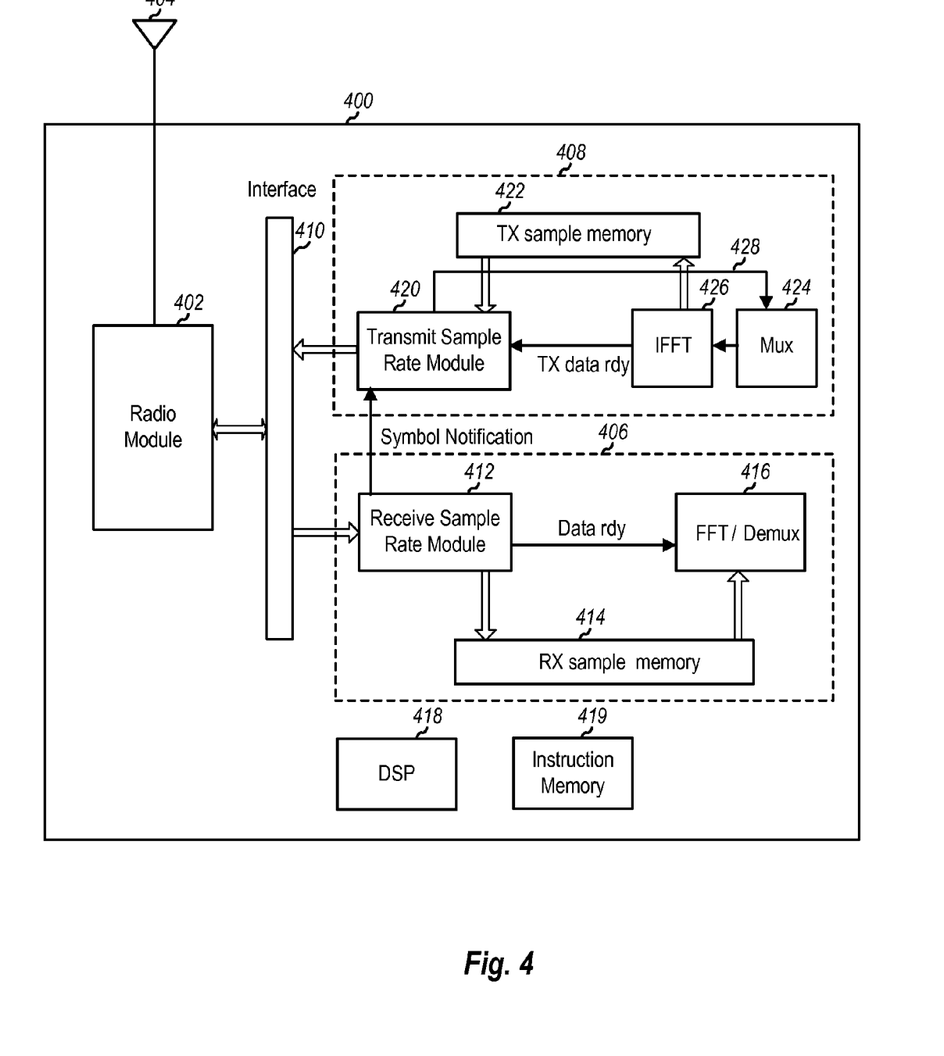
FIG. 4 illustrates an exemplary communication device operable in a communication system that utilizes the presently disclosed apparatus and methods.

FIG. 4 illustrates an exemplary communication device operable in a communication system that may be used to implement the presently disclosed apparatus and methods. The device 400, which may be part of a modem for either an access point or an access terminal, may include both receiver and transmit portions that each includes a mechanism allowing the support various different communication standards, such as UMB, LTE, and WiMax. The disclosed mechanism is the governance of symbol counting and the setting of symbol parameters through a programmable microcontroller and code (e.g., microcode) allowing flexibility and change of symbol parameters on a symbol-to-symbol basis.

In particular, device 400 includes a radio module 402 that receives and transmits data via one or more antennas (e.g., antenna 404 is illustrative of the one more antennas). The radio module 402 is interfaced to receive and transmit portions (406, 408) through an interface or bus 410. Interface 410 may be implemented by any of a number of suitable interfaces or bus devices known in the art. For example, in an aspect, interface 410 may be an AMBA® 3 AXI bus or similar protocol allowing the radio module 402 to act as a master device to the receive and transmit portions 406, 408 acting as slave devices. Furthermore, in another aspect, module 402 may issue GPS timestamps to the receive portion 406 through an AXI bus allowing the receive portion to identify packet timing thereby.

Receive portion 406, in particular, includes a Receive Sample Rate (RSR) Module 412 or similar device for receiving a sample stream of data packets from radio module 402 through interface 410. RSR module 412 is operable to extract FFT data samples from the sample stream and places the samples in a receive (RX) sample memory 414. After complete FFT data is received, the RSR module 412 signals that the data is ready and sends a job from the memory 414 to an FFT/demultiplexer module 416 to process the data. It is noted that the job may include an RX symbol number for the data, where the symbol number may be derived from the GPS timestamps. The job may also include a memory location in the sample memory 414 from which the FFT module 416 may recover the data. RX symbol parameters (e.g., FFT length, CP length, etc) and the derivation of the symbol counting from the GPS times are configured by a digital signal processor (e.g., DSP 418) and instructions stored in a memory (e.g., memory 419), which will be described more fully later.

The transmit portion 408 may include a Transmit Sample Rate (TSR) module 420 that reads samples from a transmit (TX) sample memory 422. Since the TX and RX sample rates are normally equal, the TSR 420 typically, on average, generates one TX sample for each RX sample. Accordingly, the RSR module 412 may also notify the TSR module 420 of the arrival of each RX data packet from the radio module 402 to help ensure equality of the TX and RX sample rates (shown by the arrow between module 412 and module 420).

For TX by the transmit portion 408, the number of TX samples need to be counted. Accordingly, the TSR module 420 notifies a multiplexer (MUX) block 424 every time a symbol is required, as illustrated by communication coupling 428. The MUX 424 creates the symbol, which is then processed by an Inverse Fast Fourier transform (IFFT) block 426 that places the time-domain samples in the TX sample memory 422. The IFFT block 426 then notifies the TSR module 420 that the samples are ready, as indicated by the arrow from block 426 to module 420. In response, the TSR module 420 reads the samples from the sample memory 422 and creates data and timestamp packets that it sends to the radio module 402. In an example where interface 404 is an AXI interface, the TSR module 420 will act as an AXI slave. Thus, in this case TSR module 420 notifies the radio module 402 that the packets are ready and the radio module 402 performs an AXI read to grab the data from TSR module 420.

Figure 5:
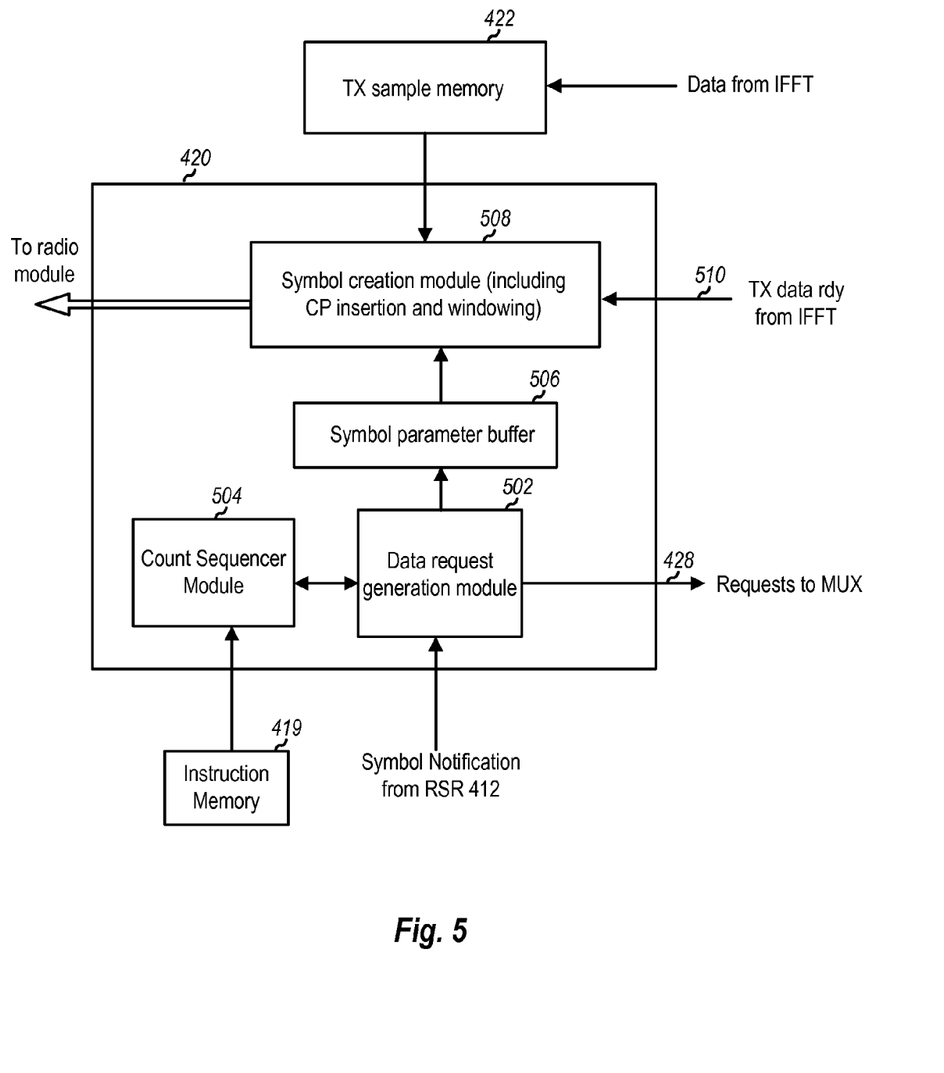
FIG. 5 illustrates an internal block diagram of the TSR module shown in the device of FIG. 4.

FIG. 5 illustrates an internal block diagram of the TSR module 420 used in the apparatus of FIG. 4. TSR module 420 includes a data request generation module 502, which is configured to receive symbol notifications from the receive portion 406. In an aspect, if the TX and RX sample rates are the same, each notification means that TSR module 420 must generate a same number of samples as those received by the receive portion 406. Accordingly, data request generation module 502 is configured to count the total number of requested samples, from which the data request generation module 502 may determine when a complete next symbol must be generated. When this occurs, module 502 will get a next symbol number from a count sequencer module 504 and send a request to MUX block 424 (as illustrated by arrow 428). The count sequencer module 504 is configured to generate the symbol numbers and symbol parameters for the symbols based on instructions in an instruction table read from instruction memory 419. In an aspect, the instruction table is determined by a digital signal processor (not shown in FIG. 5), such as DSP 418 shown in FIG. 4. Parameters for the symbols, which may include the FFT size, CP, window and guard times, are stored in a symbol parameter buffer 506.

When MUX 424 and IFFT 426 generate the requested samples, IFFT 426 places an n number of FFT samples (nFFT) in the TX sample memory 422, where nFFT is the FFT length for a particular symbol. After the data is written to memory 422, the IFFT 426 will notify a symbol creation module 508 in TSR 420 that the data is ready with a job command illustrated by input 510. In an aspect, the job command 510 may contain the address in the sample memory 422 for the TX samples that are retrieved by the symbol creation module 508. In particular, symbol creation module 508 reads the TX samples from the sample memory 422 and the saved symbol parameters in the symbol parameter buffer 506. The symbol creation performed by module 508 may include the CP insertion, windowing, and digital gain and frequency adjustment.

After a TX is generated by module 508, the symbol is shipped to the radio module 402 via interface 410. In one aspect, the symbol is shipped via data and timestamp packets based on a predetermined protocol. Additionally, it is recognized that OFDM symbol boundaries may not align with the packet boundaries of the predetermined protocol. Accordingly, the symbol creation module hardware may be configured to implement a gatekeeper function at this point to determine whether to send the samples making up the symbol. According to an aspect, the data transfer from the TSR module 420 to the radio module 402 is through an AXI interface (i.e., interface 410 configured as an AXI interface) with the TSR module 420 acting as the slave and radio module 402 as the master. Thus, the TSR module 420 would notify the radio module 402 that the data is ready, and the radio module 402 would, in turn, perform an AXI read.

Figure 6:
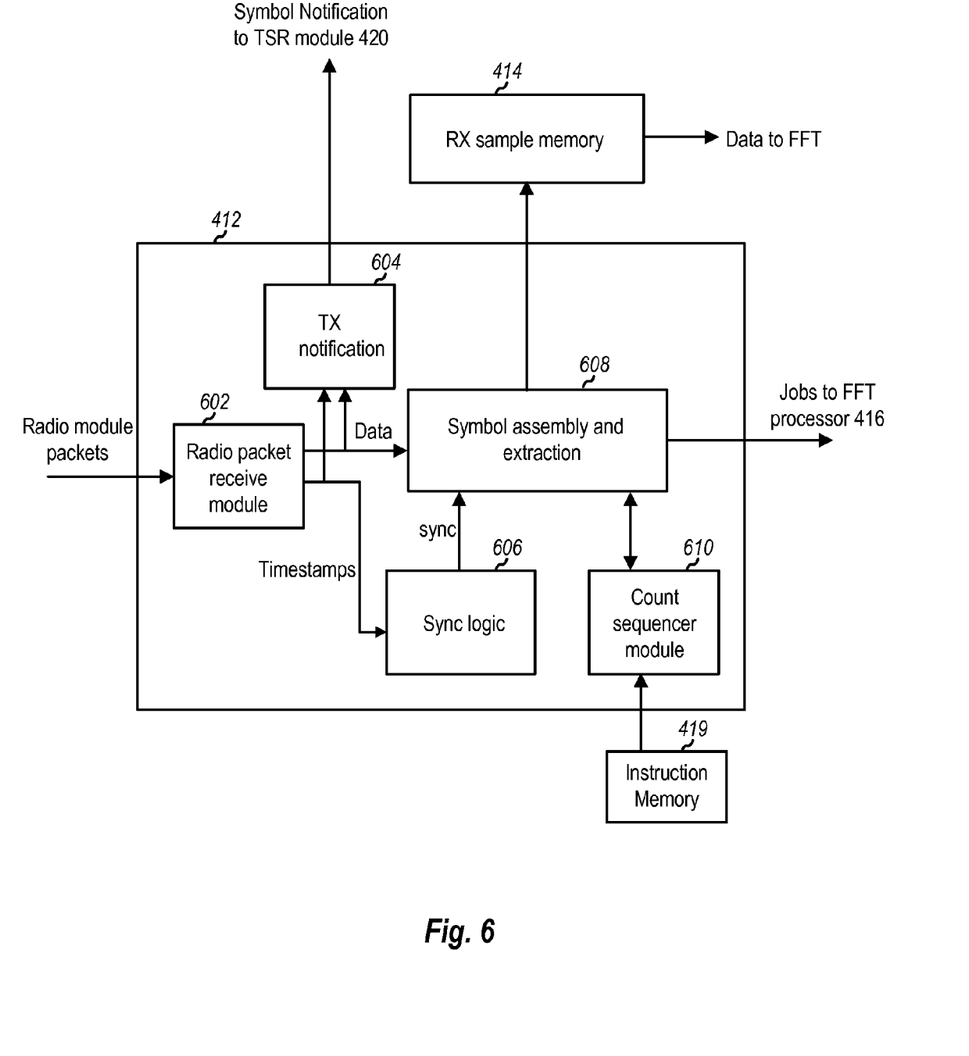
FIG. 6 illustrates an internal block diagram of the RSR module shown in the device of FIG. 4.

FIG. 6 illustrates an internal block diagram of the RSR module 412 used in the apparatus of FIG. 4. Module 412 includes a radio packet module 602 that is configured to receive data packets received by the radio module 402. The data packets include data packets, as well as timestamp packets from the interface 410. Both timestamp packets and data packets are sent to a transmit notification module 604, which is configured to send a symbol Notification to TSR module 420 for the data packets that arrive.

The timestamp packets are also output from module 602 to a synchronization logic 606. Logic 606 is configured to wait until the timestamp value from radio module 402 and interface 410 matches a predetermined target time value. This target time value may be determined by DSP 418 (not shown in FIG. 6) or other similar device or logic. When the match is found, the synchronization logic 606 is in a synchronized state.

After synchronization, the data packets are also sent to a symbol assembly and extraction module 608, which receives synchronization information from logic 606. The symbol assembly and extraction module 608 is operable to determine when a complete symbol's worth of samples have arrived. This determination is based at least on symbol parameters received from a count sequencer module 610, which allow the symbol assembly and extraction module to determine when a complete symbol's worth of samples have arrived. For example, module 608 may determine that a complete symbol has arrived after an nFFT+nCP+nWin+nGuard number of samples have been received. After each symbol has arrived, the count sequencer module 610 is then used to generate the symbol count and symbol parameters for each next sample.

After a symbol has arrived, the symbol assembly and extraction module 608 loads the subsequent nFFT samples into the RX sample memory 414 and sends a job signal to the FFT/demux block 416 to process the samples stored in memory 414. In an aspect, the job contains the symbol number.

Concerning the count sequencer module 610, this module is first initialized to generate the symbol number and parameters for a first received symbol. The count sequencer module 610 includes hardware that fetches instructions from an instruction table stored in the instruction memory 419, which may be written by a DSP or other similar logic or firmware. Execution of instructions by the count sequencer module 610 is used in determining symbol numbers and particular symbol parameters for the symbols, even from symbol to symbol if required, such as in LTE systems, or when transitioning between one OFDM technology to another.

Figure 7:
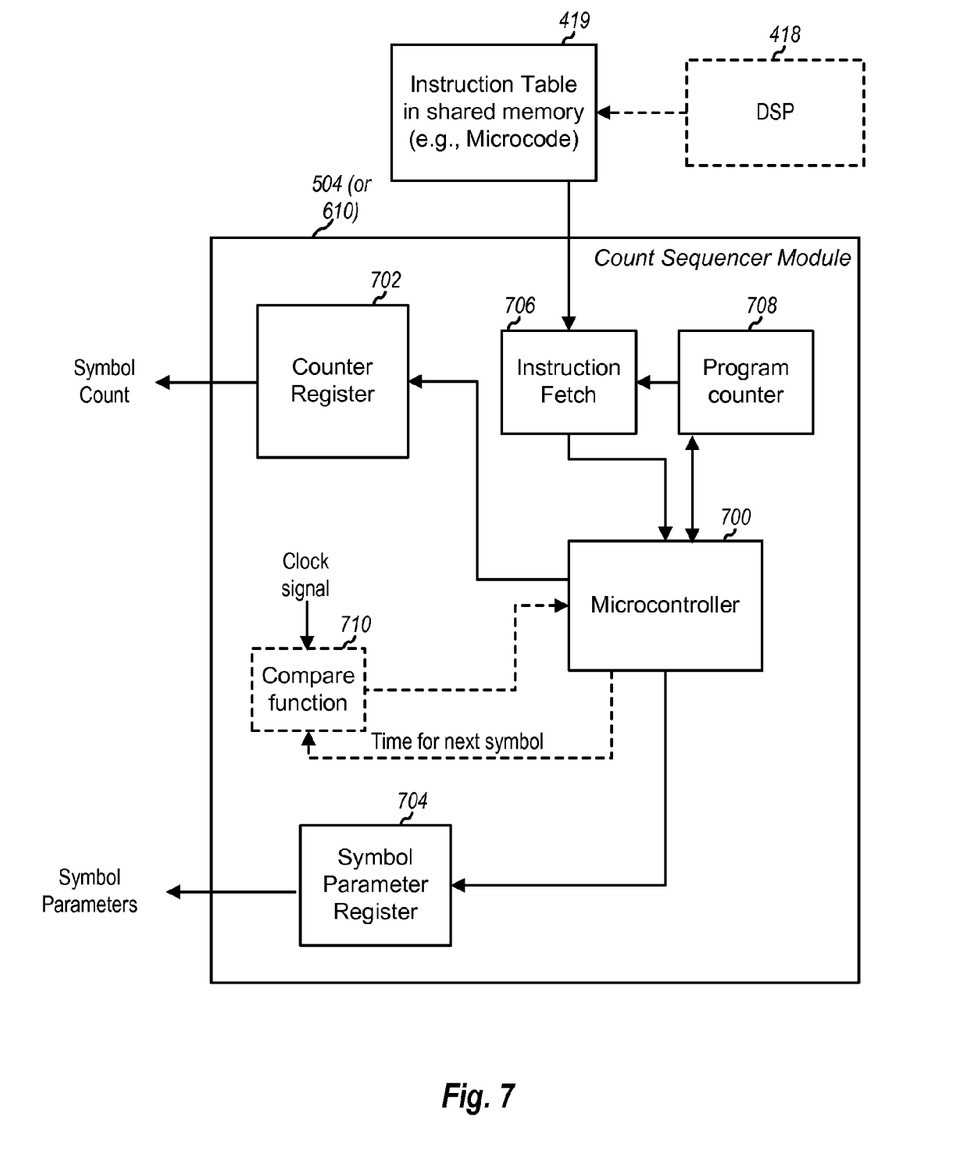
FIG. 7 illustrates an exemplary internal block diagram of a count sequencer module that may be used in the modules shown in FIGS. 5 and 6.

FIG. 7 illustrates an exemplary internal block diagram of a count sequencer module that may be used for either of the modules 504 or 610 shown in FIGS. 5 and 6, respectively. In particular, it is noted that both the RSR and TSR modules 412 and 420 may utilize similarly configured count sequencer modules to generate symbol numbers and keep track of symbol parameters that change from a symbol-to-symbol basis. The count sequencer modules 504 or 610 utilize a microcontroller-based control (e.g., microcontroller 700) that affords an arbitrary sequencing of the symbol numbers and changes in the symbol parameters for both RSR and TSR modules. In both cases, the count sequencer modules 504, 610 via microcontroller 700 outputs a symbol count from a counter register 702 or other suitable output device and one or more symbol parameters from a symbol parameter register 704 or similarly suitable output device.

Microcontroller 700 is programmed by reading or fetching instructions from memory 419, via an instruction fetch unit 706. The fetching by fetch unit 706 is under to the control or direction of a program counter 708, or similar device. Program counter 708 is in communication with microcontroller 700, where one or both units (700, 708) are operable to keep track or count of the loading of instructions for a symbol. Program counter 708 and/or microcontroller 700 direct fetch unit 706 to fetch or load the instructions from memory 419 to microcontroller 700 based on the program count, which are then processed by the microcontroller for a new symbol, even for each new symbol if desired or needed. The type of instructions processed may include the setting of symbol parameter values and symbol, frame, and superframe counts as examples, as well as incrementing the symbol, frame and superframe counts, which are discussed later in further detail.

Figure 8:
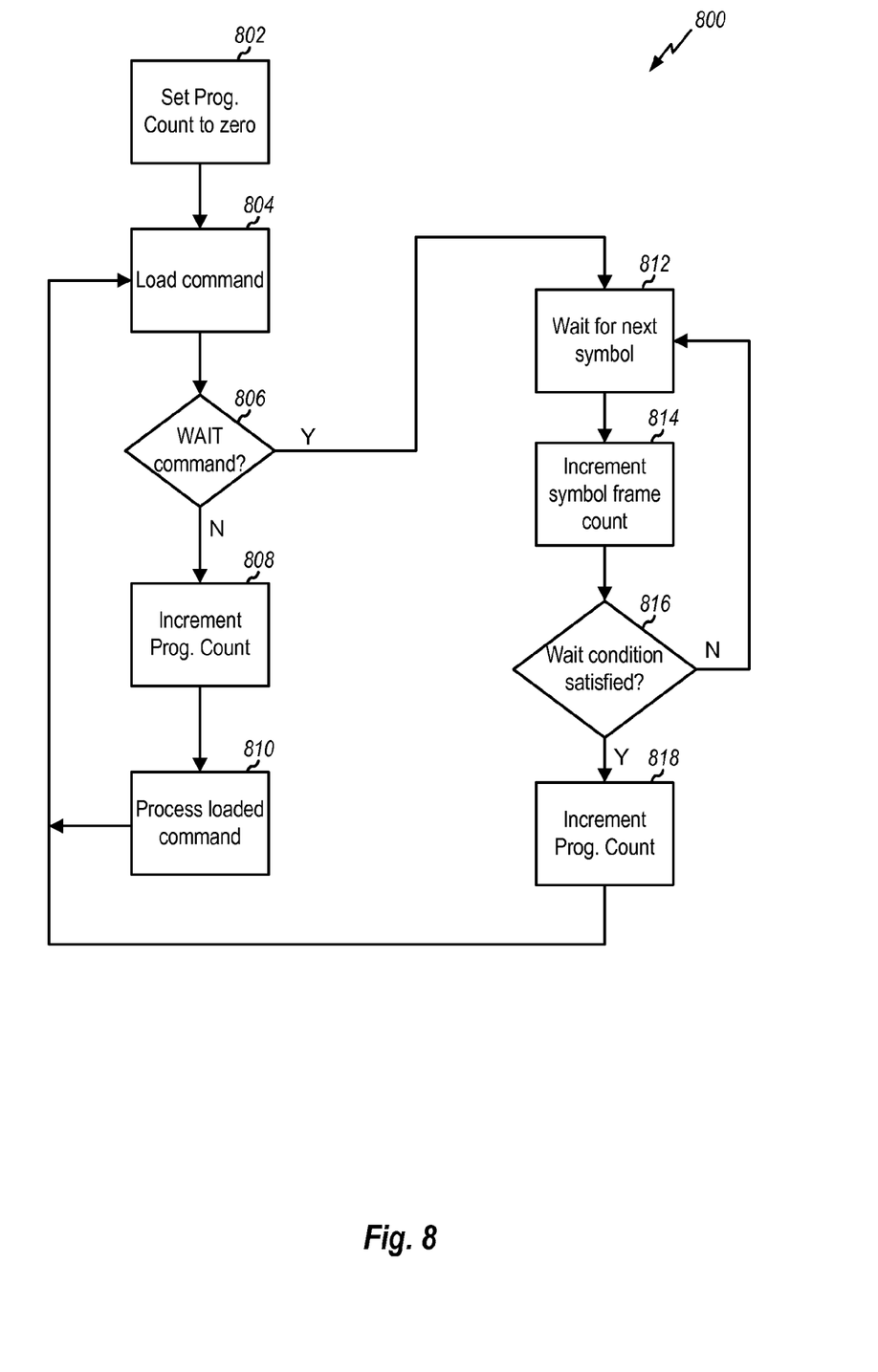
FIG. 8 is a flow diagram of an exemplary operation of the count sequencer module of FIG. 7.

As an example of the operation of the microcontroller 700 and program counter 708, FIG. 8 illustrates an exemplary flow diagram of the operation. At an initial block 802, the program counter 708 is set to zero. After the program counter is set in block 802, flow proceeds to block 804 where a command is loaded by fetch unit 706 under control of the program counter 708. Additionally, it is noted that the process of block 804 includes the microcontroller 700 loading a base instruction table address into the instruction fetch unit 706 when preceded by the initialization process of block 802.

After block 804, flow proceeds to decision block 806. If a field in the loaded instruction is not equal to a WAIT command (where the count sequencer will wait for a condition such as a next symbol as an example), the microcontroller 700 increments the program counter for the next load as indicated by block 808 and processes the current instruction or command as indicated by block 810. After the instruction is processed at block 810, flow proceeds back to block 804 where command or instruction fetching, count incrementing, and instruction processing of blocks 804, 808 and 810 continues until a WAIT instruction is received as determined at block 806.

Upon receipt of a WAIT command as determined at block 806, flow proceeds to block 812 where the microcontroller 700 will then wait for a next symbol. Additionally, a symbol frame count may be incremented as indicated in block 814. The symbol frame count is a count of the symbol number within a frame. After the symbol frame count has been incremented, flow proceeds to decision block 816 where the microcontroller 700 determines if the WAIT condition is yet satisfied. As examples, the WAIT condition that may be determined is waiting until a predetermined number of symbols has been counted, which could provide an indication that a frame has occurred, waiting for another count indicating that a frame boundary has occurred, or waiting until a determination is made that a superframe boundary has occurred based on a frame count. If the WAIT condition is not satisfied flow proceeds back to block 812. When the WAIT condition is finally satisfied, the program count is incremented as shown in block 818 and regular instruction processing resumes, as indicated by return to block 804.

Turning back to FIG. 7, it is noted that in one aspect a number of different fields may be counted by the counter register 702. To support the UMB specification, for example, counter register 702 may be configured to provide three count levels: a symbol count within a frame, a frame count of the number of frames within a superframe, and superframe count that counts the number of superframes. It is noted that these hierarchical counts are merely exemplary, and that various other numbers of counts may be utilized when accommodating different technologies, such as LTE or WiMax. Additionally, these counts may be configured to be reset at frame and superframe boundaries, as examples. In another aspect, counter register may also include a couple of free buffer counters: a symbol buffer count that increments on each symbol number, and frame buffer count that increments on each frame. These buffer counts would not be reset on frame and superframe boundaries, as is done with the other fields above. Consequently, these counters can be used by hardware blocks to toggle buffer positions.

In another aspect, there may be one or more fields within the symbol parameter register 704. As examples, the fields may describe the lengths of the OFDM symbol components, including the FFT, CP, window, and guard. An active bit field may also used to indicate if the symbol is active in TDD operation.

The symbol counter and parameters are updated through a sequence of instructions. Since a microcontroller is utilized in the count sequence modules, the instructions may be abbreviated as compared to normal computer code. Accordingly, the sequence of instructions may be characterized as "microcode" due to its smaller size and executable by a dedicated microcontroller 700. According to an aspect, each instruction of the microcode may be described by a predetermined number of bits instruction word (e.g., a 32-bit instruction word). In a further aspect, the instruction word contains bits for the operation to be performed (e.g., SET (setting a value), INCR (incrementing a count), BNEQ (a compare function determining if a value is equal or not to a predetermined value) and WAIT, as well as other operations that may also be contemplated by those skilled in the art). Each instruction word may also include a parameter field indicating the subject parameter of the operation (i.e., the parameter type), such as the symbol, frame, or superframe counts, or particular OFDM parameters (.e.g., nFFT, nCP, nWin, nGuard values), or any other various parameters for logical operations and other various operations such as flag (e.g., "Active") indicating that a symbol is active such as in TDD operation. The instruction word also includes the parameter value of the parameter type, and a branch destination indication for branching operations.

Figure 9:
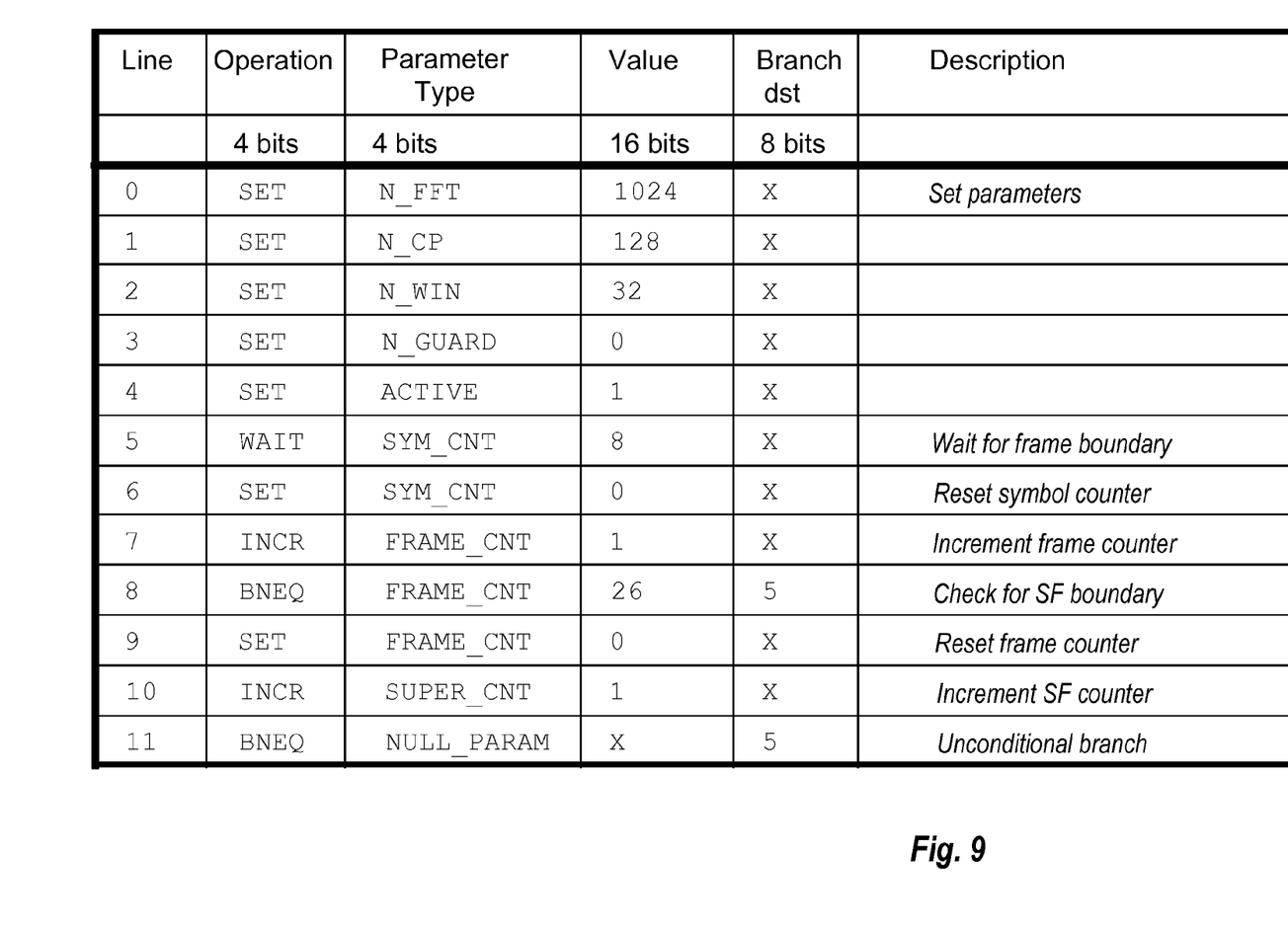
FIG. 9 is an exemplary table of microcode that may be utilized with count sequencer module of FIG. 7.

FIG. 9 illustrates an exemplary microcode table that may be written to the memory 419 by the DSP 418 or other similar device. The particular example of FIG. 9 is for a UMB TDD system, and is merely an example of one technology type. Those skilled in the art will appreciate that the microcode will be tailored to various technologies, and that the use of variously tailored microcodes in conjunction with a microcontroller affords variability for a multimode device utilizing a single hardware device (e.g., count sequencer module with a microcontroller), yet with a desirable reduction in the instruction count and complexity.

As may be seen in the exemplary table of FIG. 9, each of the shown 11 lines of the microcode comprises a 32 bit instruction word having a parameter field of 4 bits, a parameter type field also having 4 bits, the parameter value having an allotted 16 bits, and a branch destination line number having 8 bits. The microcode instructions may be executed sequentially, but may also branch back as illustrated by instruction line 8, for example. When the particular BNEQ operation indicated in line 8 is executed, a determination is made to see if the frame count is equal to 26, which would indicate a superframe boundary. If the condition is not met, the branch destination directs the microcode back to a particular designated line number. In this particular case, the line number is line 5. Thus, the microcode directs the microcontroller to branch back to line 5 of the microcode for the execution of lines 5-8 again until the condition of line 8 is met. As mentioned, the example of FIG. 9 is merely one of any number of various microcodes tailored to different OFDM technologies, and the microcode could be less complex with fewer instruction lines, or allow for more complexity with a greater number of instruction lines. Moreover, those skilled in the art will appreciate that either less or more fields may be employed in each instruction word of the microcode as desired.

Once again turning back to FIG. 7, count sequencer module 504 or 610 may also include in one alternative aspect a compare function unit 710. Unit 710 is used to compare a time set or determined by the microcontroller 700 for the start of a next symbol with a current clock time signal. The start of the next signal may be determined based on known timing or a known sample rate for the current OFDM technology. When the time for the new symbol occurs, the output of the compare unit 710 changes signaling to the microcontroller 700 to indicate that a new symbol is beginning. It is noted that unit 710 is shown separate from microcontroller 700, but one skilled in the art will appreciate that the compare function could also be incorporated in the microcontroller 700. It will also be appreciated that the time comparison function is performed under the direction of instruction words from the microcode. The determination of a new symbol beginning can prompt the microcontroller 700 to read additional microcode via the program counter 708 and instruction fetch 706. This allows symbol parameters, in turn, to be updated on a symbol-by-symbol basis.

Figure 10:
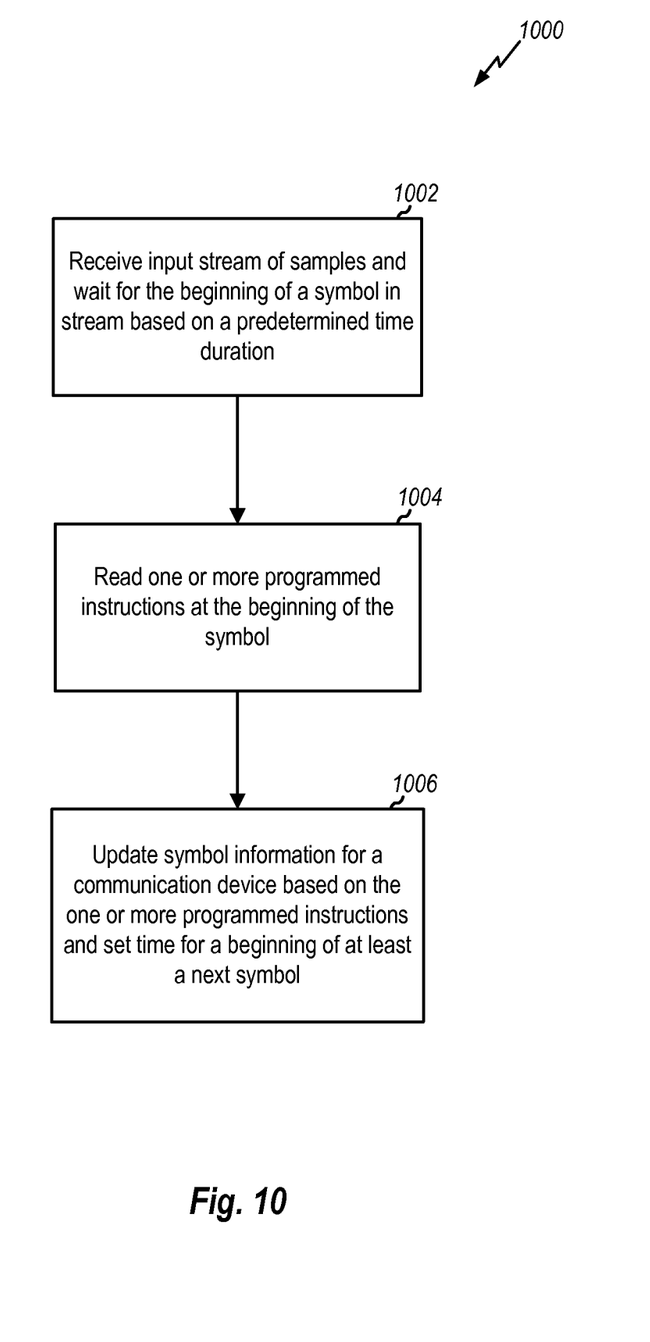
FIG. 10 is a flow diagram of an exemplary method for symbol updates in a communication device.

FIG. 10 illustrates a method that is effected by the disclosed count sequencer module. The method 1000 may be implemented by a count sequencer module used in either a transmit portion of a communication device (e.g., transmit portion 408 and TSR module 420) or a receive portion (e.g., receive portion 406 and RSR module 412). In a first block 1002, the method 1000 includes receiving a stream of samples in a communication device, such as device 400 in FIG. 4, and waiting for the beginning of a symbol in the stream of samples. It is noted that the term "receiving" does not limit receiving to the receive portion of a communication device, but also refers to receiving samples to be transmitted by the transmit portion of a communication device. Thus, using the examples of FIGS. 4-6, sample streams would be received either from IFFT 426 and memory 422 in the case of a transmit portion, or from radio module 402 and interface 410 in the case of a receive portion.

The beginning of the symbol may be determined based on a predetermined time duration of input stream of samples assuming a known sample rate of the sample input stream. Determination of the predetermined time duration may be performed by the microcontroller 700, as an example. In another example, the expiration of the time duration may be carried out by the alternate compare function 710 illustrated in FIG. 7.

After the determination of the symbol beginning in block 1002, flow proceeds to block 1004 where the one or more programmed instructions (e.g., instruction words of the microcode) are read. In an example, the process of reading the instructions involves the program counter 708 directing instruction fetch 706 to read instructions stored in memory 419 into microcontroller 700. After the programmed instructions are read, flow proceeds to block 1006 where symbol information is updated for a communication device based on the one or more programmed instructions; namely execution of those instructions. It is noted that "symbol information" includes symbol parameters such as FFT size or CP size, and symbol counts, such as symbol, frame and superframe counts. Additionally, a time for a beginning of at least a next symbol or subsequent symbols (i.e., boundaries) is set, which may be also based on the programmed instructions. It is noted that the processes of blocks 1004 and 1006 may be carried out by hardware, such as microcontroller 700, as well as other elements in a count sequencer module (504 or 610), such as counter register 702 and the symbol parameter register 704. It is also noted that method 1000 may be repeated continuously for each symbol received or transmitted in a communication device.

Figure 11:
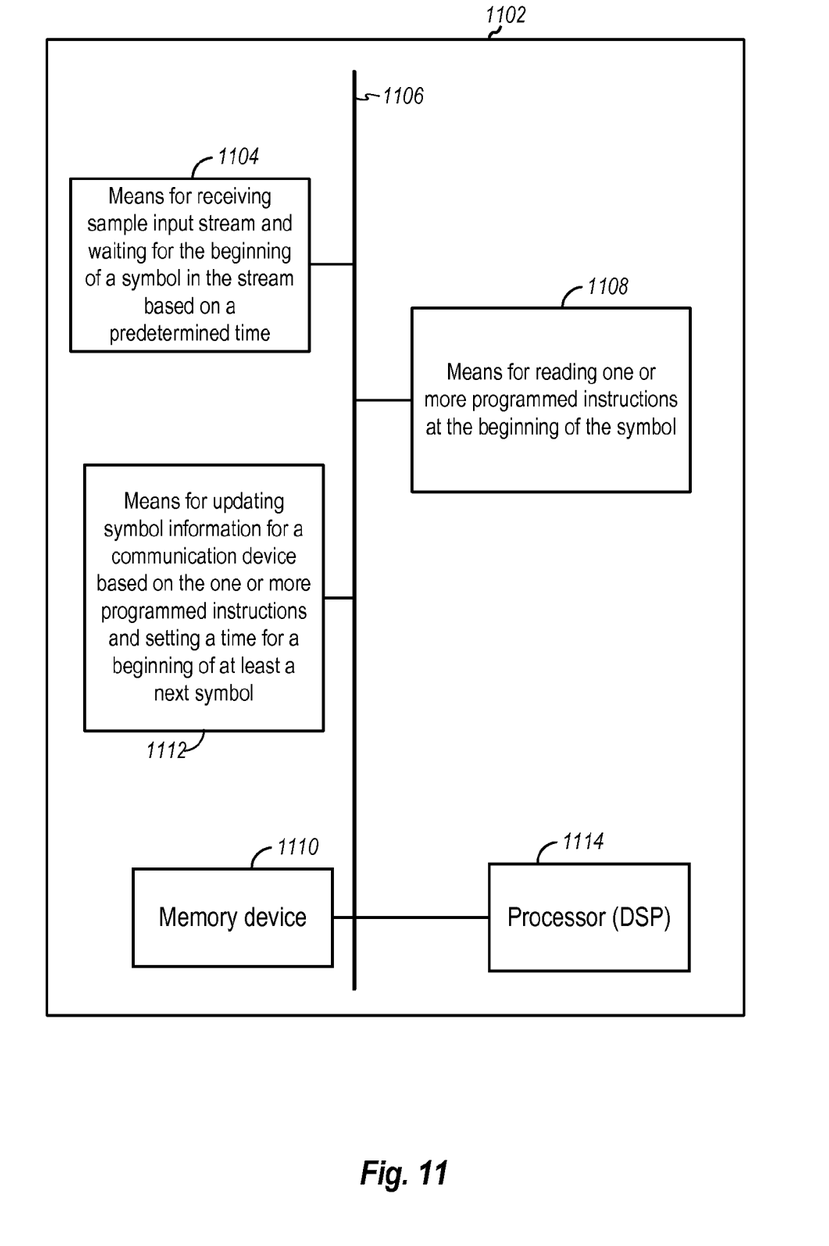
FIG. 11 is a block diagram of an apparatus that updates symbols in a communication device.

FIG. 11 illustrates another apparatus 1102 that may be used for update of symbol information (i.e., parameters) in a communication device, such as an access terminal. Apparatus 1102 includes a means 1104 for receiving a sample input stream and waiting for the beginning of a symbol in the stream based on a predetermined time. An exemplary implementation of means 1104 may include count sequencer modules 504 or 610 including a microcontroller 700, as well as transmit sample memory 422 for a transmit portion or radio receive packet module 602. The information determined by means 1104 may then be communicated to various other modules in apparatus 1102 via a bus 1106, or similarly suitable communication coupling or interface.

Apparatus 1102 also includes means 1108 for reading one or more programmed instructions at the beginning of the symbol, which was determined by means 1104. In an example, means 1108 could be implemented by instruction fetch 706 and program counter 708, as well as microcontroller 700. Additionally, means 1108 reads the programmed instructions from a memory device 1110, which may be implemented as instruction table memory 419 as an example, or any suitable storage for storing the instructions. The instructions may be a microcode, such as the microcode explained before.

Furthermore, apparatus 1102 includes means 1112 for updating symbol information for the communication device based on the one or more programmed instructions and setting a time for a beginning of at least a next symbol. Means 1112 may be implemented, as an example, by microcontroller 700, and one or both of counter register 702 and parameter register 704. Additionally, it is noted that apparatus 1102 may also include a processor, such as a DSP 1114, which among other things writes the one or more programmable instructions to memory device 1110.

In light of above disclosed apparatus and methods, it may be seen that the utilization of disclosed hardware and microcode allows a communication device to change or update symbol information (e.g., parameters and counting) with minimal hardware, yet with the flexibility to accommodate various different communication standards in the device.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

While, for purposes of simplicity of explanation, the disclosed methodologies are shown and described herein as a series or number of acts, it is to be understood that the processes described herein are not limited by the order of acts, as some acts may occur in different orders and/or concurrently with other acts from that shown and described herein. For example, those skilled in the art will appreciate that a methodology could alternatively be represented as a series of inter-related states or events, such as in a state diagram. Moreover, not all illustrated acts may be required to implement a methodology in accordance with the subject methodologies disclosed herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed examples is provided to enable any person skilled in the art to make or use the presently apparatus or methods. Various modifications to these examples will be readily apparent to those skilled in the art, and the generic principles defined herein may be applied to other examples without departing from the spirit or scope of the present disclosure. Thus, the present disclosure is not intended to be limited to the examples shown herein but is to be accorded the widest scope consistent with the principles and novel features disclosed herein.

What is claimed is:

1. An apparatus for updating symbol information in a communication device, the apparatus comprising:
    means for waiting for the beginning of a symbol in a sample stream at a predetermined time;
    means for reading one or more programmed instructions from an instruction memory in the communication device at the beginning of the symbol; and
    means for updating symbol information including symbol parameters based on the one or more programmed instructions and setting a time for a beginning of a next symbol.

2. The apparatus as defined in claim 1, wherein the symbol parameters relate to symbol characteristics including one or more of a number of samples in an FFT, a number of samples in a cyclic prefix (CP), a number of samples in a symbol window, a number of samples in a guard interval, a total number of symbols in a frame, and a total number of symbols in a superframe.

3. The apparatus as defined in claim 1, wherein the symbol information includes symbol counts relating to at least one of a count number of symbols within a frame, a count of frames within a superframe, and a count of superframes.

4. The apparatus as defined in claim 1, wherein the one or more programmed instructions are instruction words executable by dedicated microcontroller hardware.

5. The apparatus as defined in claim 1, wherein the one or more programmed instructions are programmable by a digital signal processor into the instruction memory for each symbol.

6. The apparatus as defined in claim 1, wherein the one or more programmed instructions relate to at least one of a particular orthogonal frequency division multiplexing (OFDM) technology and a particular mode of operation.

7. The apparatus as defined in claim 6, wherein the particular OFDM technology includes Ultra Mobile Broadband (UMB), Long Term Evolution (LTE), and WiMax technologies.

8. The apparatus as defined in claim 6, wherein the particular mode of operation includes time division duplexing and frequency division duplexing.

9. The apparatus as defined in claim 1, further comprising:
    means for creating a symbol for transmission by the communication device based on the updated symbol information.

10. The apparatus as defined in claim 1, further comprising:
means for extracting a symbol received by the communication device from the sample stream based on the updated symbol information.

* * * * *